United States Patent
Porikli et al.

(10) Patent No.: US 8,429,102 B2
(45) Date of Patent: Apr. 23, 2013

(54) DATA DRIVEN FREQUENCY MAPPING FOR KERNELS USED IN SUPPORT VECTOR MACHINES

(75) Inventors: Fatih Porikli, Watertown, MA (US); Huseyin Ozkan, Boston, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 8 days.

(21) Appl. No.: 13/076,749

(22) Filed: Mar. 31, 2011

(65) Prior Publication Data

US 2012/0254077 A1    Oct. 4, 2012

(51) Int. Cl.
*G06F 15/18* (2006.01)
*G06F 17/00* (2006.01)
*G06N 5/00* (2006.01)

(52) U.S. Cl.
USPC .............................................. 706/12; 706/45

(58) Field of Classification Search ........................ None
See application file for complete search history.

(56) References Cited

U.S. PATENT DOCUMENTS 7,076,473 B2 * 7/2006 Moghaddam ................... 706/20

OTHER PUBLICATIONS

Burges, Christopher J.C. "A Tutorial on Support Vector Machines for Pattern Recognition." Data Mining and Knowledge Discovery 2.2 (1998) 121-167.*
A. Rahimi and B. Recht. Random features for large-scale kernel machines. In Advances in Neural Information Processing Systems (NIPS), 2007.*
Maldonado-Bascon, S.; Lafuente-Arroyo, S.; Gil-Jimenez, P.; Gomez-Moreno, H.; Lopez-Ferreras, F.; , "Road-Sign Detection and Recognition Based on Support Vector Machines," Intelligent Transportation Systems, IEEE Transactions on, vol. 8, No. 2, pp. 264-278, Jun. 2007.*
Kiran, C.G.; Prabhu, L.V.; Rahiman, V.A.; Rajeev, K.; Sreekumar, A.; , "support vector machine learning based traffic sign detection and shape classification using Distance to Borders and Distance from Center features," TENCON 2008—2008 IEEE Region 10 Conference , vol., No., pp. 1-6, Nov. 19-21, 2008.*

* cited by examiner

*Primary Examiner* — Kakali Chaki
*Assistant Examiner* — Daniel Pellett
(74) *Attorney, Agent, or Firm* — Dirk Brinkman; Gene Vinokur

(57) ABSTRACT

Frequency features to be used for binary classification of data using a linear classifier are selected by determining a set of hypotheses in a d-dimensional space using d-dimensional labeled training data. A mapping function is constructed for each hypothesis. The mapping functions are applied to the training data to generate frequency features, and a subset of the frequency are selecting iteratively. The linear function is then trained using the subset of frequency features and labels of the training data.

16 Claims, 7 Drawing Sheets

100

DATA DRIVEN FREQUENCY MAPPING FOR KERNELS USED IN SUPPORT VECTOR MACHINES

FIELD OF THE INVENTION

This invention relates generally to classifying data, and more particularly to selecting nonlinear features for binary classification using linear support vector machines.

BACKGROUND OF THE INVENTION

A support vector machine (SVM) is often used for binary classification of data. The SVM can work with either a linear or a nonlinear kernel. The SVM constructs a hyperplane or set of hyperplanes in a high or infinite dimensional space, which can be used for classification, regression or other tasks. A good separation is achieved by the hyperplane that has a largest distance to the nearest training data if any, because in general, the larger the margin the lower the generalization error of the classifier. The radial basis function SVM is able to approximate any decision boundary between two classes as it lifts the separating hyperplane into a higher possibly infinite dimensional space.

However, the SVM does not scale well with the nonlinear kernel when the amount of training data is very large. Training nonlinear SVMs such as radial basis function SVM, can take days and testing unknown data with nonlinear SVMs can be prohibitively slow to incorporate into a real application. This is not the case if the linear kernel is used, especially when a dimensionality of the data is small.

If the kernel uses a Gaussian radial basis function, then the corresponding feature space is a Hilbert space of infinite dimension. In the case for nonlinear kernels, one must now employ N (number of support vectors) kernel evaluations to determine the projection of the unknown data onto the normal vector of the hyperplane in the reproducing kernel Hilbert space (RKHS). This is because one does not have a direct access to the RKHS, which might be infinite dimensional, but an indirect access through inner products provided by the kernel function.

One possible solution is to factor the kernel matrix and use the columns of the factor matrix as features with the linear kernel to avoid the computational complexity of the nonlinear kernel. Classification of unknown data with the linear kernel is fast because one only needs to project the normal vector of the separating hyperplane between two data classes.

Another solution is to approximate the kernel in a space of Fourier random, data blind features as an inner product of the transformed data, wherein one can train the linear kernel to these features. It is known that with this approach, the necessary number of Fourier features is relatively small, i.e., the dimensionality of the space of Fourier features is low, and training with the linear kernel is considerably faster that training with the nonlinear kernel. However, the trained SVM is blind, cannot use any data priors, and the classification performance is limited.

For some applications, the computational complexity of classification is extremely high. Therefore, it is desired to reduce the time for data classification while achieving a high classification performance as nonlinear kernels.

SUMMARY OF THE INVENTION

The embodiments of our invention provide a method for classifying data in a frequency domain instead of the original domain using support vector machines.

A set of frequency features is selected from training data. The set of features is sufficient to represent a continuous, shift-invariant kernel. Then, feature selection e.g., a LogitBoost process is applied to select a subset of the set of features in an iterative manner to directly optimize the classification accuracy.

We construct the following mapping. For a binary classification task, given training data $x_i$ with labels $y_i$, that is $\{x_i, y_i\}$ where $x_i \in R^d$ and $y_i \in \{-1, +1\}$, the SVM lifting function $\phi: R^d \to R^m$ maps the input data points x to the frequency feature space defined by $\phi$ such that $$x \to z(x) = [z_\omega(x)_1, \ldots, z_\omega(x)_m]^T.$$

Here, a frequency feature is $z_\omega(x)_j$. One focus of this invention is the selection of the frequency features. To accelerate both the training and classification phases of SVMs for binary data classification tasks, we map the input data to a data driven low-dimensional space of frequency features.

After transforming the data $\{x_i, y_i\} \to \{z(x_i), y_i\}$, we train a linear classifier, which is in one embodiment an SVM with a linear kernel in a low-dimensional frequency feature space. Because m is significantly smaller than d, we obtain drastic reduction in the computational complexity of the SVM in terms of both training and classifying, with competitive classification performance, if not better.

First, we generate a set of features using the labeled training data so that the inner products of the transformed data, via the hypothesis features, are approximately equal to the ones in a reproducing kernel Hilbert space of a predefined continuous, shift-invariant kernel. We select a subset of these features by a feature selection process to directly target classification accuracy, as opposed to approximating the kernel function. Specifically, we use a LogitBoost process as the feature selection process, and then apply a linear classifier, for which we use a SVM with a linear kernel.

To eliminate useless, redundant or irrelevant features, we apply feature selection. Feature selection selects a subset of relevant features for constructing accurate models. By removing most irrelevant and redundant features from the data, feature selection helps improve the performance of the models by alleviating the effect of the curse of dimensionality, enhancing generalization capability, speeding up training process; and improving model interpretability. Feature selection also indicates the important features, and their relationship.

To speed up the training process, we determine a subset of the original frequency bases for feature selection. Determining the optimum subset is very difficult because it is a combinatorial problem. Thus, we follow iterative solutions in our feature selection. This way, only useful features are selected for training the linear SVM. By approximating the kernel function as inner products and eliminating indiscriminative features in terms of classification, a significant reduction in the computational complexity of kernel machines is obtained in terms of both training and classifying.

The features are selected using the training data and their corresponding labels. Thus, our method is a supervised method. Moreover, our method does not approximate the kernel function. Instead, we construct a new kernel as an inner product. Hence, our method be characterized as a kernel design, thus the classification accuracy of our method is not bounded by a preset kernel function.

This is the first time a data driven representation of a nonlinear kernel into a frequency space is disclosed for significantly reducing the computational load.

DETAILED DESCRIPTION OF THE PREFERRED EMBODIMENT

Support Vector Machine (SVM)

Figure 1:
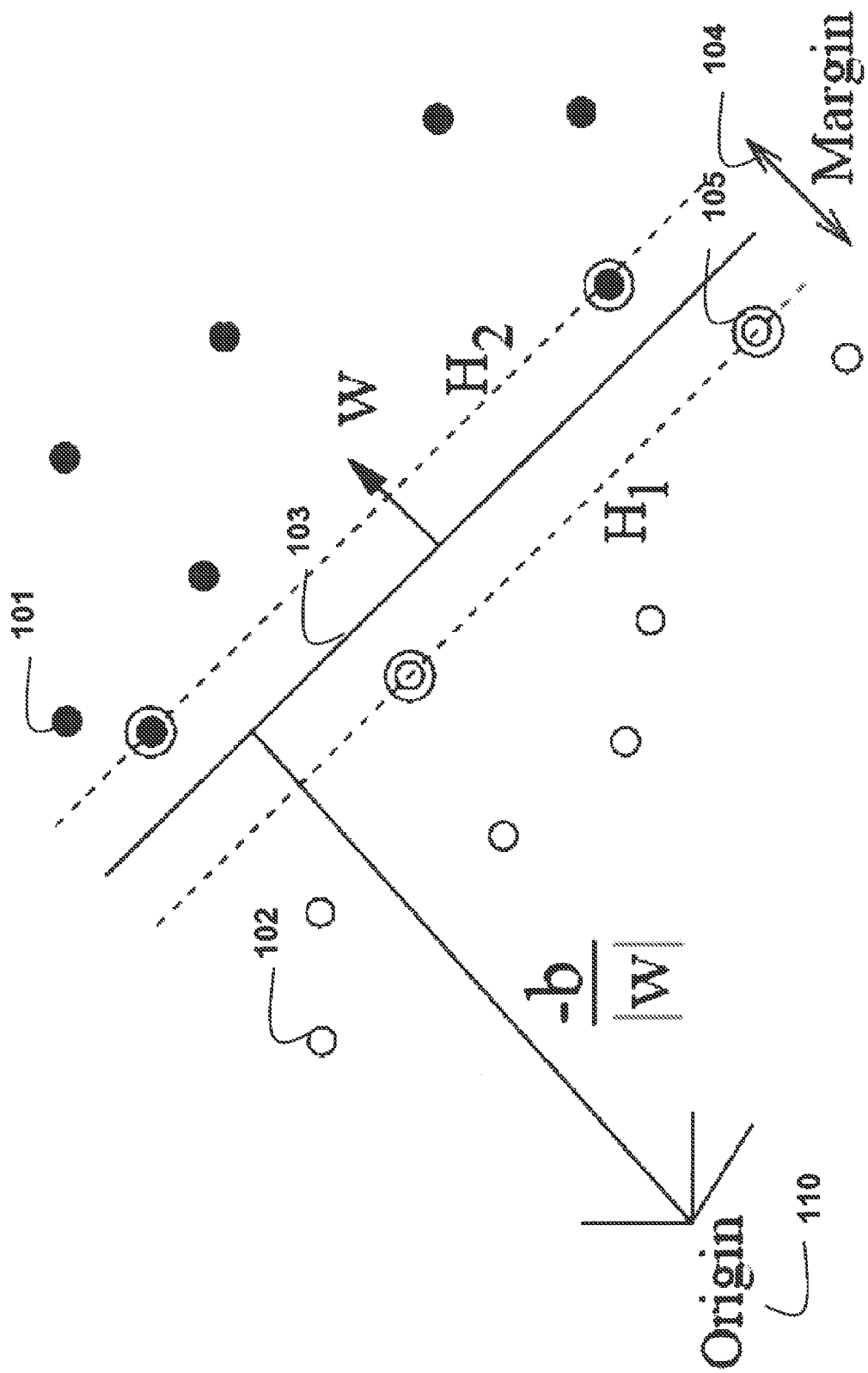
FIG. 1 is a schematic of a support vector machine used by embodiments of the invention.

FIG. 1 shows the basic concepts of a support vector machine (SVM) 100 used by embodiments of our invention. Data to be classified into two classes are shown by black circles 101 and white circles 102, with respect to an origin 110. A hyperplane 103 constructed from training data separates the two classes. The hyperplane is supported by support vectors 105. The amount of separation between hyperplanes $H_1$ and $H_2$ is a margin 104, and W is a vector normal to the hyperplane.

Given training data $x_i$ and corresponding labels $y_i$ where $x_i \in R^d$ and $y_i \in \{-1, +1\}$, a training procedure constructs a decision function, which determines the class of unknown data. The decision function can define a linear or nonlinear boundary depending on the structure of the training data. If an optimum separation is through a linear function of the data, then we use a linear kernel, and if not, we use a nonlinear kernel.

The training data are separable if there exist a vector $w \in R^d$, a transpose operator T, and a real number $b \in R$, such that $$y_i(w^T x_i + b) - 1 \geq 0$$

for all 1, and determine the data are not linearly separable otherwise.

Linear SVM for Separable Data

We start with the simplest case. We have separable training data $\{x_i, y_i\}$ where $x_i \in R^d$ and $y_i \in \{-1, +1\}$, and there is at least one pair (w, b) such that $y_i(w^T x_i + b) - 1 \geq 0$ for all i. Any hyperplane with a normal vector w that satisfies separability can be used as a classifier. Theoretically, there are an infinite number of hyperplanes. We select an optimal separating hyperplane.

For a given separating hyperplane, the shortest perpendicular distance from a point of positive class (negative class) to the hyperplane is let $s_+$ ($s_-$), and the margin is $s_+ s_-$.

For the separating hyperplane, with properly selected w and b, we can have the following equalities for some data points $$w^T x_i + b = 1, y_i = 1$$

$$w^T x_i + b = -1, y_i = -1$$

Then, $$s_+ = s_- = \frac{1}{\|w\|} \rightarrow \text{margin} = s_+ + s_- = \frac{2}{\|w\|}.$$

Thus, we can find the optimum separating hyperplane as the one that maximizes the margin. The linear SVM for separable training data solves the following primal optimization $$(w^*, b^*) = \operatorname{argmin} \frac{1}{2\|w\|}$$

subject to $$y_i(w^T x_i + b) - 1 \geq 0$$

for all i. The data that satisfy the constraints of the above optimization the support vectors 105, whose removal changes the solution.

Switching to a Lagrangian formulation of the problem results in convex quadratic programming problem, which lets us rewrite the above primal optimization by taking advantage of Wolfe dual formulation, as follows (dual form optimization)

$$\alpha_i^* = \operatorname{argmax} \sum_i \alpha_i - \frac{1}{2} \Sigma \alpha_i \alpha_j y_i y_j x_i^T x_j$$

subject to $$\sum_i \alpha_i y_i = 0,$$

$$\alpha_i \geq 0,$$

$$w^* = \sum_i \alpha_i y_i x_i$$

where $\alpha_i$ are Lagrange parameters in a dual formulation.

The dual optimization and the primal optimization give the same unique solution, the optimum separating hyperplane. In the dual optimization problem, the data in the training set with $\alpha_i > 0$ are the support vectors. Support vectors are the most crucial elements of the training data set because removal of even one support vector can change the solution completely and removal of all data which are not support vectors does not change the solution to the problem. Because the support vectors are data nearest to the separating hyperplane, the support vectors are only a small subset of the training data. If there are N support vectors, then $$w^* = \sum_i^{N_s} \alpha_i y_i x_i.$$

The optimization problem for the SVM has important aspects. The constraints are always linear and convex. This is known as the Karush-Kuhn-Tucker (KKT) conditions, necessary and sufficient conditions for w*, b*, a* to be the optimal solutions. Determining a solution to KKT conditions for the SVM problem plays a central role in developing numerical methods for the primal-dual optimizations. Moreover, in the dual formulation, the bias solution b* is not explicitly determined, but knowing the fact that the KKT conditions must hold, we can determine the bias easily.

Linear SVM for Non-Separable Data: Soft and Hard Margin

For most of the real data, there is no hyperplane that perfectly separating two classes of data, hence, the separability assumption above needs to be relaxed. First, if the data to be classified are non-separable data, then there is no solution. Hence, now, we want to modify it. What we want to relax is $$w^T x_i + b = 1, y_i = 1$$

$$w^T x_i + b = -1, y_i = -1.$$

This can be achieved if errors are allowed. Data lying on the wrong side of a candidate hyperplane are penalized by an amount proportional to the distance between the data and the hyperplane. To incorporate this idea in the above formulation, we use slack variables ψ

$$w^T x_i + b = 1 - \psi, y_i = 1$$

$$w^T x_i + b = -1 + \psi, y_i = -1$$

$$\psi_i \geq 0.$$

Thus, for an error to occur, the corresponding $\psi_i$ must exceed unity. Then, it is natural to minimize $\Sigma \psi_i$ as a cost function defined over all errors. Then, the primal formulation of the SVM problem becomes $$(w^*, b^*) = \operatorname{argmin} \frac{1}{2} \|w\| + C \Sigma \psi_i$$

subject to $$w^T x_i + b = 1 - \psi, \quad y_i = 1$$
$$w^T x_i + b = -1 + \psi, \quad y_i = -1$$
$$\psi_i \geq 0,$$

where C is a parameter representing the trade-off between the error minimization and margin maximization. A larger C leads to a hard margin classifier, and can result in overfitting, and a smaller C leads to a soft margin classifier.

Correspondingly, the dual formulation becomes $$\alpha_i^* = \operatorname{argmax} \sum_i \alpha_i - \frac{1}{2} \Sigma \alpha_i \alpha_j y_i y_j x_i^T x_j$$

subject to $$\Sigma \alpha_i y_i = 0,$$
$$C \geq \alpha_i \geq 0,$$
$$w^* = \Sigma \alpha_i y_i x_i.$$

Thus, the only difference is that, now, the $\alpha_i$'s are upper bounded by C. As before, the KKT conditions can readily be applied for this non-separable case as well.

Kernel SVM and Nonlinear Decision Boundaries

If there are no hyperplanes that can separate the classes of data, then nonlinear boundaries are used. Considering the dual formulation of the linear SVM, the dependency on data comes only through the dot products $x_i$, $x_j$. We can map the data into another Euclidean space H (possibly infinite dimensional) via a mapping $\phi : R^d \to H, x \to \phi(x)$.

If we train the linear SVM in H, then we only need to provide the information $\phi(x_i) \cdot x_i$ when a kernel function $$K(x_i, x_j) = \phi(x_i) \phi(x_j)$$

is known. In other words, we do not need to know the function φ when we have the kernel of φ. To train the linear SVM in H, we change the dual formulation according to $$\alpha_i^* = \operatorname{argmax} \sum_i \alpha_i - \frac{1}{2} \Sigma \alpha_i \alpha_j y_i y_j \Phi(x_i) \Phi(x_j)$$

subject to $$\Sigma \alpha_i y_i = 0,$$
$$C \geq \alpha_i \geq 0,$$
$$w^* = \Sigma \alpha_i y_i [(\Phi(x))_i).$$

One observation is that w∈H so it might seem that for classification we need to know w explicitly. However, by taking the advantage of the relation $K(x_i, x_j) = \phi(x_i) \phi(x_j)$ we can express the decision function in terms of the dot products in H and so the classification becomes $$f(x) = w^T \Phi(x) + b = \sum_i^{N_S} \alpha_i y_i \Phi(x_i) \Phi(x_j) = \sum_i^{N_S} \alpha_i y_i K(x_i, x).$$

To apply the classifier to unknown data, we need $N_s$ kernel evaluations. This can be impractical for some applications or tasks, and might become computationally too complex and inapplicable. This is one of the major limitations of the SVM due to the following. We have no control over the number of support vectors. The support vectors must be selected from the training data. If the support vectors are selected from the entire space, then the set of support vectors is much smaller.

One possible solution approximates the kernel classification function with a reduced expansion of the same form, i.e., $N_S$ becomes $N_Z$ and $N_Z \ll N_S$. Another solution is to use only a subset of the support vectors. However, this solution results in a sharp reduction in the classification performance. In this sense, the set of support vectors is a minimal set.

The most commonly used kernel is the well known Gaussian kernel or the Radial Basis Function (RBF)

$$K(x_i, x_j) = e^{-g \|x_i - x_j\|^2}$$

for some g. In this particular example, H is infinite dimensional. Even if the mapping φ is known explicitly, it would be very difficult to incorporate with infinite dimensional objects in the SVM formulation. However, through the RBF kernel, it is very straightforward in terms of both training and classification.

Figure 2:
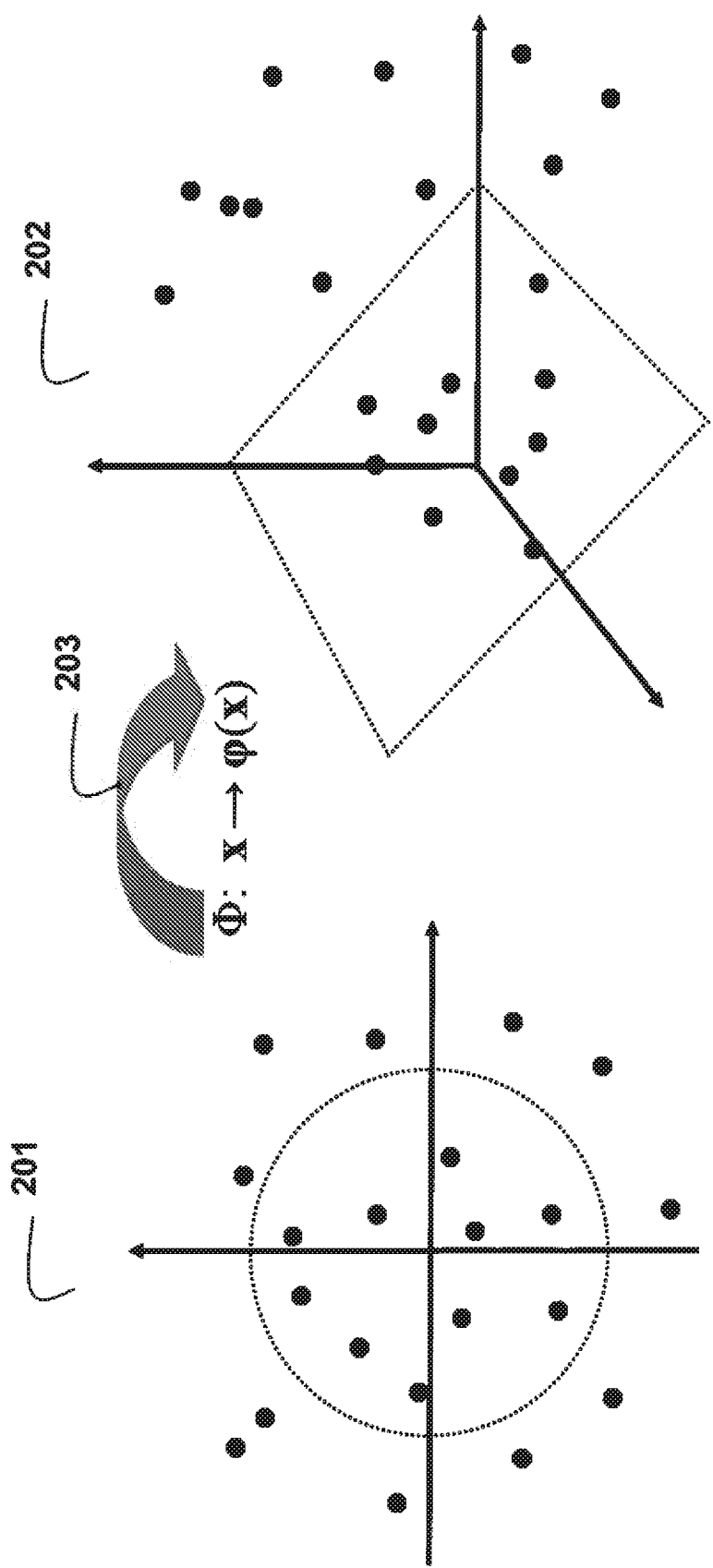
FIG. 2 is a schematic of a radial kernel basis function support vector machine used by embodiments of the invention.

FIG. 2 shows the general idea mapping of the SVM from a first space 201 to a second, possibly infinite dimensional, space 202 using the mapping function φ(x) 203 as described above.

The idea of using kernels with SVM is to map 203 the input data 201 to a very high dimensional space 202 wherein we expect linear seperability. In this case, the linear SVM is trained in the high dimensional space and the returned hyperplane corresponds to a nonlinear decision boundary. We obtain the nonlinear decision boundary because by selecting the kernel, we disturb the original correlation structure of the input space through a nonlinear kernel in a way the new correlation structure, i.e., the dot products in the high dimensional space, enables the linear separation. If we use the linear kernel $K(x_i, x_j) = x_i^T x_j$, we obtain the linear SVM.

Mercer's Condition

Not every function $K: R^d \times R^d \to R$ corresponds to a space H and a mapping to $\phi(x) : R^d \to H$, such that $K(x_i, x_j) = \phi(x_i) \phi(x_j)$. In other words, not every K is a kernel. To determine whether a function K is a kernel, one can use Mercer's condition, where K is a kernel if and only if for every square integrable function $$\int K(x_i, x_j) g(x_i) g(x_j) dx_i dx_j \geq 0$$

Frequency Features

Detection of target image regions is an important task in many applications, including vehicle navigation. For this purpose, it is possible to use a SVM classifier to detect, for instance, road signs by applying a scanning window over input images. Because the size of the road sign is unknown, the scanning has to be done on multiple scales with different sized windows.

In one application, we train a classifier using 10,000 a first set of positive images and a second set of 1,000,000 negative images to obtain a kernel (RBF) SVM classifier with $N_S \sim 700$ support vectors. As low-level features, we extract histogram of oriented gradients (HOG) for every image, which means $x \in R^{32 \cdot 4}$. According to our experiments, a good accuracy (90%) takes around 20 minutes for classification of a high definition image. This is a computationally prohibitive for a real-time road sign detection. Hence, classification time must be reduced and to do so, the computational complexity of kernel SVM must be reduced.

Here, we describe a novel method that drastically speeds up testing of nonlinear kernel machines. We factor the kernel function itself, however this factorization is conveniently data driven, and allows us to convert the training and evaluation of a kernel machine into the corresponding operations of a linear machine by mapping data into a relatively low-dimensional feature space that is determined by the distributions of the binary class labels.

We first generate a set of frequency features that are rich enough to approximate the separating boundary between two classes of data points and the continuous, shift-invariant kernel that we implicitly impose. Instead of relying on the lifting provided by the kernel trick, we explicitly map the data to a low-dimensional Euclidean inner product space using a data driven feature map $z: R^d \to R^m$ so that the inner product between a pair of transformed points approximates their kernel evaluation $k(x,y) = (\phi(x), \phi(y)) \approx z(x)^T z(y)$. Unlike the kernel's lifting $\phi$, z is low-dimensional. Thus, we can simply transform the input with frequency mapping onto z, and then apply linear methods to approximate the decision boundary established through a nonlinear kernel.

In one embodiment, we employ the well known Logit-Boost process, which is a logistic regression on the hyperplane normal, in training to select features from this set while directly optimizing the classification accuracy as opposed to targeting kernel function approximation. We start with the set of hypotheses, i.e., frequency features that are constructed from the labeled training data. Then for each hypothesis, we map the data onto a vector. We apply weighted least squares fitting of the labels to the mapped data and compute a regression error. We select the hypothesis that gives the minimum regression error. After adjusting the weights, we select the next hypothesis.

This way, we collect only useful frequency features to train a linear machine. In comparison to the prior art, where features are collected totally random and independently, we take advantage of the available training data and the corresponding labels in a supervised setting.

By approximating the nonlinear separating boundary as an inner product of frequency transformed features and eliminating non-descriptive features by feature selection, these data driven feature maps give us an extremely fast method to quickly evaluate the classifier. For example, with the kernel trick, evaluating the radial basis function support vector machine at a test point x requires O(Nd) operations, where N is the number of training points, to compute and retain much of the dataset unless the boundary is simple and sparse. This is often unacceptable for large datasets. On the other hand, after learning a hyperplane $\omega$, a linear machine can be evaluated by simply $f(x) = \omega^T z(x)$, which requires only $O(m(d+1))$ operations and storage, where m is the number of the selected features. Note that, for most problems m<<d<N.

This can also be considered as a kernel design where we naturally construct a data driven kernel, as opposed to approximating the kernel. Therefore, the classification accuracy of our method is not upper bounded by a fixed kernel function. In fact, we obtain better classification results in some datasets, in addition to significantly decreasing the computational load.

Bochner's theorem from harmonic analysis on groups characterizes the Fourier transform of a positive finite measure. Given a positive finite Borel measure $\mu$ on the real line L, the Fourier transform $f(\omega)$ of $\mu$ is the continuous function $$f(\omega) = \int_L e^{-j\omega x} d\mu(x).$$

The function $f(\omega)$ is a positive definite function, that is the kernel $k(x,y) = f(x-y)$ is positive definite. Bochner's theorem also says the converse is true, i.e. every positive definite function $f(\omega)$ is the Fourier transform of a positive finite Borel measure $\mu$;

A continuous kernel $k(x,y) = f(x-y)$ on $R^d$ is positive definite if and only if $f(x-y)$ is the Fourier transform of a non-negative measure.

When the kernel k(x,y) is properly scaled, Bochner's theorem guarantees that its Fourier transform $f(\omega)$ is a proper probability distribution:

$$k(x,y) = \int_{R^d} f(\omega) e^{j\omega^T(x-y)} d\omega = E[e^{j\omega^T(x-y)}]$$

where T is a transpose operator.

In other words, $e^{j\omega^T(x-y)}$ is an unbiased estimate of k(x,y) when $\omega$ is drawn from the Fourier transform $f$. Since the kernel is even and real valued, and the probability distribution $f(\omega)$ is purely real, the integrand $e^{j\omega^T(x-y)}$ may be replaced with $\cos(\omega^T(x-y))$. Defining $$z_\omega(x) = [\cos(\omega^T(x)) \sin(\omega^T(x))]^T$$

gives a real valued mapping that satisfies the condition $$E[z_\omega(x)^T z_\omega(y)] = k(x,y),$$

since $$z_\omega(x)^T z_\omega(y) = \cos(\omega^T(x-y)).$$

In other words, each $\omega$ maps a data point onto two coefficients as $$z_\omega(x)^T z_\omega(y) = \cos(\omega^T(x-y)) = [\cos(\omega^T x) \sin(\omega^T x)]^T [\cos(\omega^T y) \sin(\omega^T y)]$$

It is also possible to show that defining $z_\omega(x) = \sqrt{2} \cos(\omega^T x + b)$\$ and $z(x) = n^{[-0.5]} [z_{\{\omega_i\}}]^T$ where n is the cardinality of set $\omega_i$ and b is a phase parameter, which can be set with respect to data or uniformly drawn from $[0, 2\pi]$ also gives a real valued mapping, onto a single coefficient this time, that satisfies the condition $E[z(x)^T z(y)] = k(x,y)$. For a set of properly drawn bases $\{\omega_i\}$ and by law of large numbers, $$z(x)^T z(y) \approx k(x,y).$$

In other words, the Gaussian kernel, and any shift invariant, continuous kernel, can be written as an expectation of frequency features, where the bases are random with respect to a probability measure, which is the inverse Fourier transform of the kernel.

This approximation reveals a very interesting property, which is the fact that the Gaussian kernel, and any shift invariant, continuous kernel, can be approximated as the inner products of the mapped points in the space of frequency features. This is exactly the same thing as what is known as the kernel trick. That is to say, one maps the data to a very high dimensional space wherein the new covariance structure comes through the kernel. Hence, by the above derivation, we can train a linear SVM in the space of frequency features, and we still can expect the same classification accuracy as for the Gaussian kernel. The computational reduction and the speed up of our method come from this result.

Above, we describe that frequency features can approximate any even and real-valued nonlinear kernel. However, this process is blind to the content and given training data, as it does not utilize class label information or density distribution of points.

Our goal is not to approximate a prefixed kernel but to find a linear representation of a complex separating boundary via frequency features that optimize the classification performance. Now, the problem comes how to select a set of $\omega$'s such that the final classification performance is optimized. For object detection tasks, a training dataset with binary labels indicating the class memberships is often available. It is desirable to make the best use of these additional priors.

To accomplish this, we select the salient frequency features that minimize a negative binomial log-likelihood of the data as we discuss in the following section.

Boosted Feature Selection

Boosting iteratively combines weak classifiers (hypotheses), which favor those instances misclassified by previous hypotheses, into a strong classifier. In "boosting" the terms weak and strong are defined as well known terms of the art. On each round, a distribution of data point weights are updated. The weights of each incorrectly classified data points are increased and the weights of each correctly classified data points are decreased, so that the new classifier focuses more on those examples.

For the binary classification problem we have $y_i \gamma \{-1,1\}$. We initialize the weights of the data points at the first round $$\beta_n^o = \frac{1}{N}$$

for all n=1, . . . , N. We choose a weak classifier $h_t$ with respect to the weighted data points. The probability of x being in class 1 is represented by $$p(x) = e^{\{-H(x)\}} / [e^{\{H(x)\}} + e^{\{-H(x)\}}]$$

and the overall response is given by $$H(x) = \frac{1}{2} \sum_{t=1}^{L} h_t(x).$$

The LogitBoost process learns the set of regression functions $h_t(x)_{(t=1 \ldots L)}$ by minimizing the negative binomial log-likelihood of the data by $$i. \ -\sum_{\{n=1\}}^{N} [y_n \log(p(x_n)) + (1-y_n)\log(1-p(x_n))]$$

through Newton iterations. At the core of the process, LogitBoost fits a weighted least square regression, $h_t(x)$ of training points $x_n$ to response values $\lambda_n$ and weights $\beta_n$ as $$\lambda_n = \frac{0.5(y_n+1) - p(x_n)}{p(x_n)(1-p(x_n))}$$

where $$\beta_\downarrow n = p(x_\downarrow n)(1 - p(x_\downarrow n)).$$

The final response of the classifier is $$H(x) = sgn \Sigma k_t(x).$$

At each iteration, a set of hypotheses $S_M: \{\omega_1, \ldots, \omega_M\}$ are tested. The hypothesis that reduces the negative exponential loss most is combined in the boosted classifier as the current weak classifier, included in the subset of hypotheses $S_m$, and m iterations are repeated until a performance level is achieved or an upper bound on computational load is reached. Here, m is the dimensionality of transform space and cardinality of the set $S_m \subset S_M$.

An important question is how to determine the set of hypotheses $S_M$ and thus $S_m$ adaptive to the training data. Each hypothesis $\omega$ corresponds to a frequency feature $z_\omega(x) = \sqrt{2} \cos(\omega^T x + b)$ that is desired to be normal to a separating hyperplane between the two classes. The magnitude of this vector represents a space combing frequency.

In one embodiment, to obtain the set of hypotheses $S_M$ we apply a generative model based selection scheme. We extract separate probability distribution functions $\rho-$ and $\rho+$ that indicate local density for both classes $\{-1, +1\}$. We sample M points from each of these distributions to construct point pairs $\{(x^-, x^+)\}_{\{1 \ldots M\}}$. Each hypothesis corresponds to a pair such that $$\omega = \pi |x^+ - x^-|^{-2}(x^+ - x^-)$$

the combing frequency is $|\omega| = \pi |x^+ - x^-|^{-1}$, and the corresponding phase shift is $b = -\omega^T x^+$. In other words, we assign $\omega$ as the vector that connects the points of the sampled pair with the corrected norm such that $$\cos(\omega^T x^- + b) = -1, \cos(\omega^T x^+ + b) = 1,$$

and $$\cos(0.5\omega^T(x^+ - x^-) + b) = 0.$$

Figure 5:
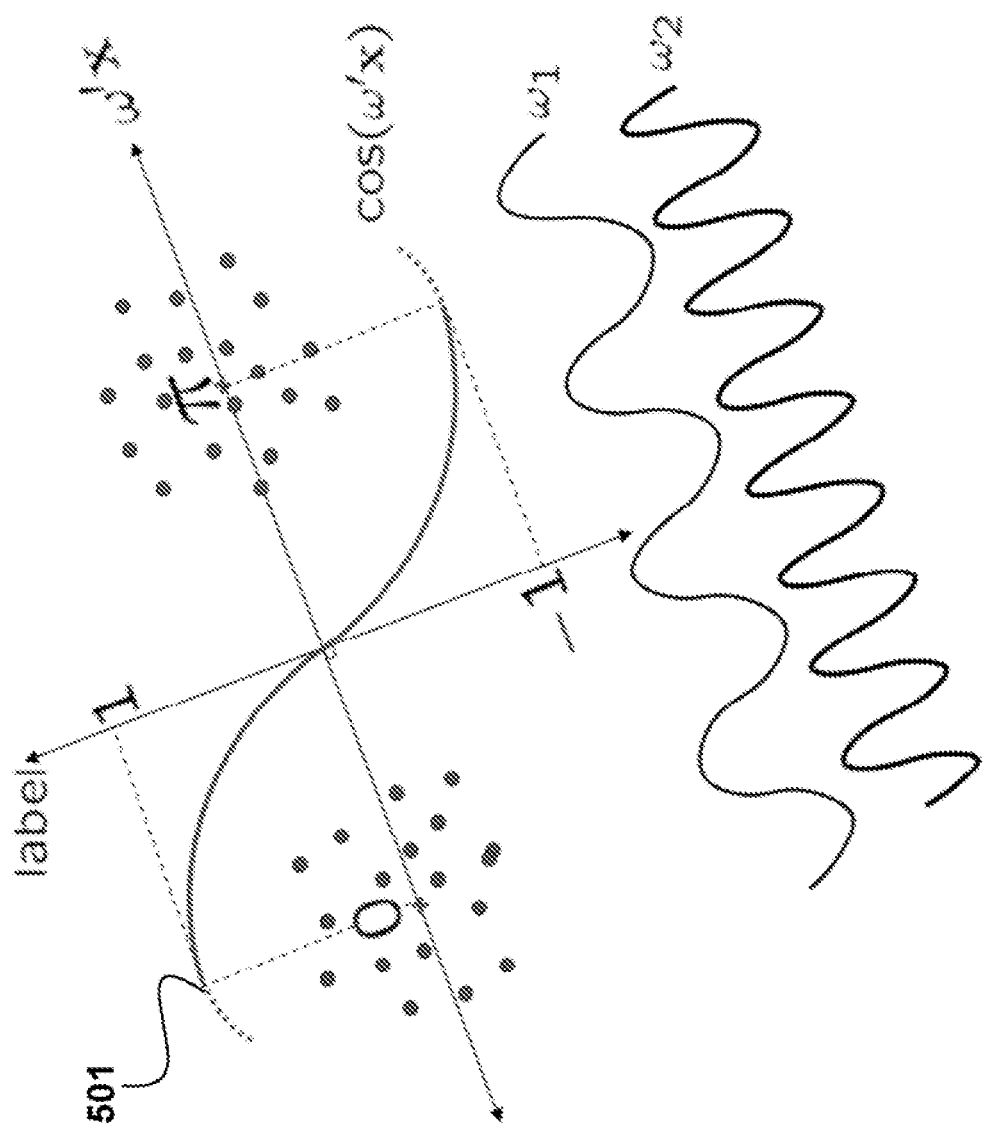
FIG. 5 is a schematic of frequency mapping and data separation according to embodiments of the invention.

As shown in FIG. 5, we place one of the separating boundaries 501 (cosine function has infinitely many sign changes, thus separating boundaries) on the middle of both points as illustrated in FIG. 5.

It is also possible to apply a weighted discriminant constraint at each iteration by incorporating point weights when we extract the probability density functions $\rho-$, $\rho+$ for tighter fittings.

After LogitBoost feature selection, we only have the m useful frequency features in terms of classification. This mapping is nonlinear by nature of frequency bases and the procedure we use selects m features from a the set $S_M$. Therefore, we can train linear methods in this new transform space, $$x \to z(x) = \sqrt{2} m^{D.5} [\cos(\omega^T x + b)_{\{1 \ldots m\}}]^T,$$

returned by the boosted feature selection.

The frequency mapping based feature selection helps to eliminate redundant and irrelevant features for classification. In addition it enhances the generalization capability and speeds up both training process and testing load. Computationally, the above transformation requires only m dot products. As we only use the useful features the set $S_M$ is minimal and so the speed up comes from this process.

It should be noted that, determining the optimum subset is NP-hard as it projects onto a combinatorial problem by nature. Yet, greedy boosting solutions provide satisfactory performance especially when M~N without affecting the speed of the testing phase.

Figure 3:
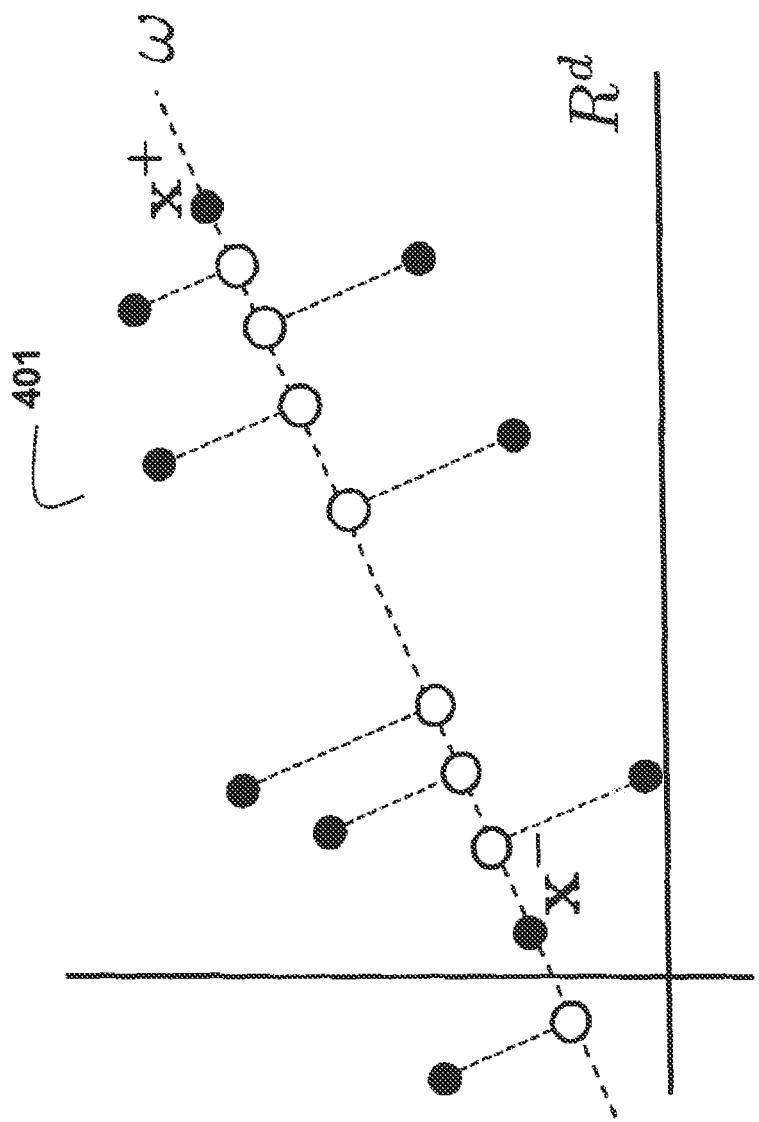
FIG. 3 is a schematic of a mapping function used by embodiments of the invention.

FIG. 3 shows a mapping function of data points 401 used by embodiments of the invention.

Figure 4:
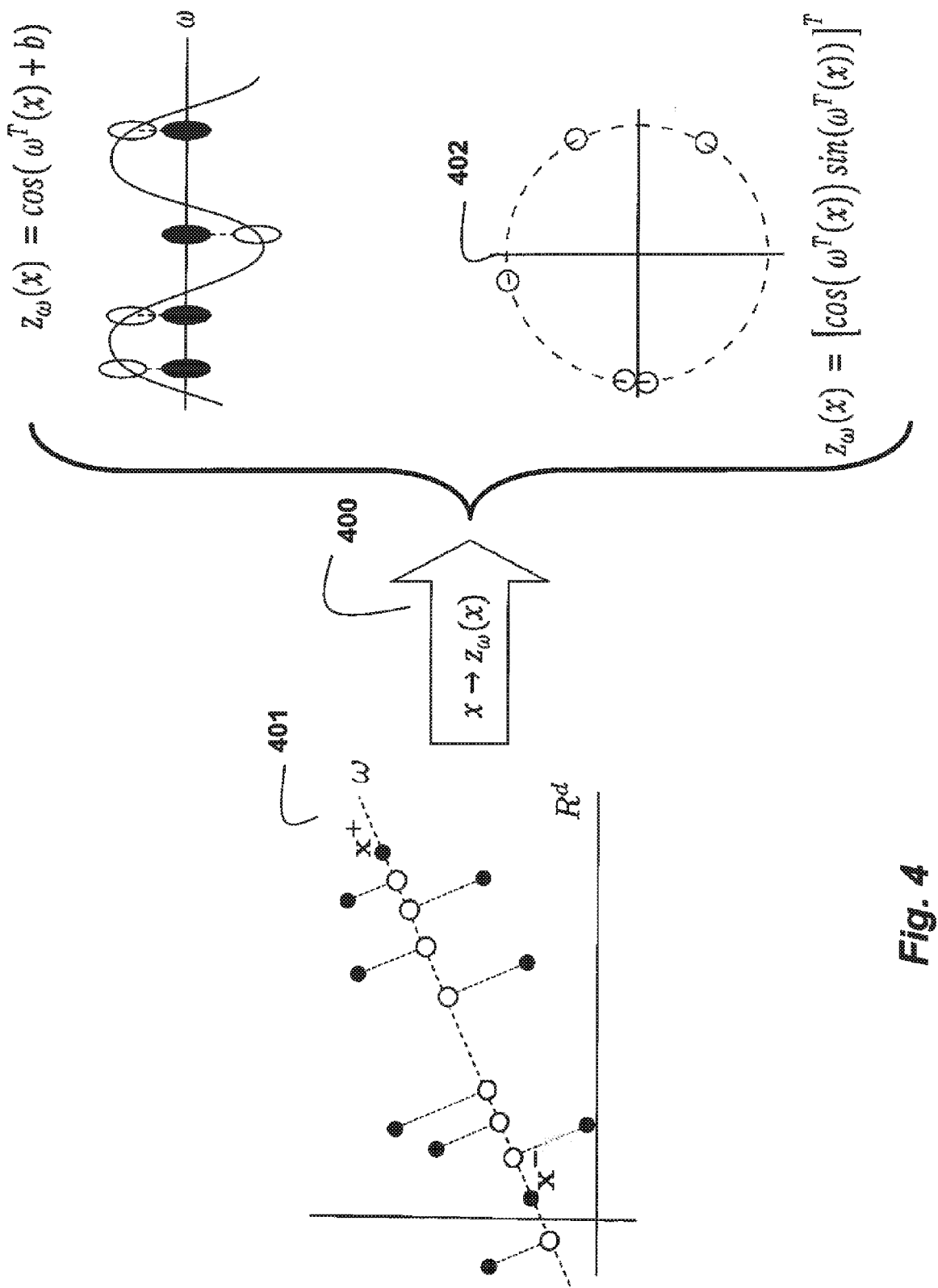
FIG. 4 is a schematic of a mapping to a frequency space according to embodiments of the invention.

As shown in FIG. 4, a mapping $x, z_\omega(x) = [\cos(\omega^T(x))\sin(\omega^T(x))]^T$ 400 maps the data points 401 to a 2m dimensional space 402, on the other hand, the mapping $x \rightarrow z_\omega(x) = \cos(\omega^T x + b)$ maps the data to m dimensional space. Hence, computationally, the second mapping is more compact. This mapping has two parameters and more degree of freedom. If b is fixed, for the following data distribution, then even one single frequency feature is sufficient to obtain good classification accuracy.

One known method is based on determining features one by one in a greedy fashion in such a way that the statistical dependency is maximized between the labels and the selected features. However, using dependency maximization is not appropriate for our purposes because statistical dependency as a measure for selection also considers nonlinear relations of the data with the labels. We only want to apply linear methods after the selection because we already obtain the nonlinear characteristics by the frequency features. Thus, we use covariance maximization as a measure for selection, which is a linear method.

In another embodiment, we start with the set of random frequency bases. Then for each basis from this set, we first generate our transformed one-dimensional data. Then, we apply weighted least squares fitting of the labels to the transformed data. This gives a regression error. We select the basis that gives the minimum regression error. After adjusting the weights, we select the next basis. This process returns the set of features we use for our classification. Having this set constructed, we define our final nonlinear transformation. Hence, with this final nonlinear transformation of the original data, we only have the useful frequency features in terms of classification.

Figure 6:
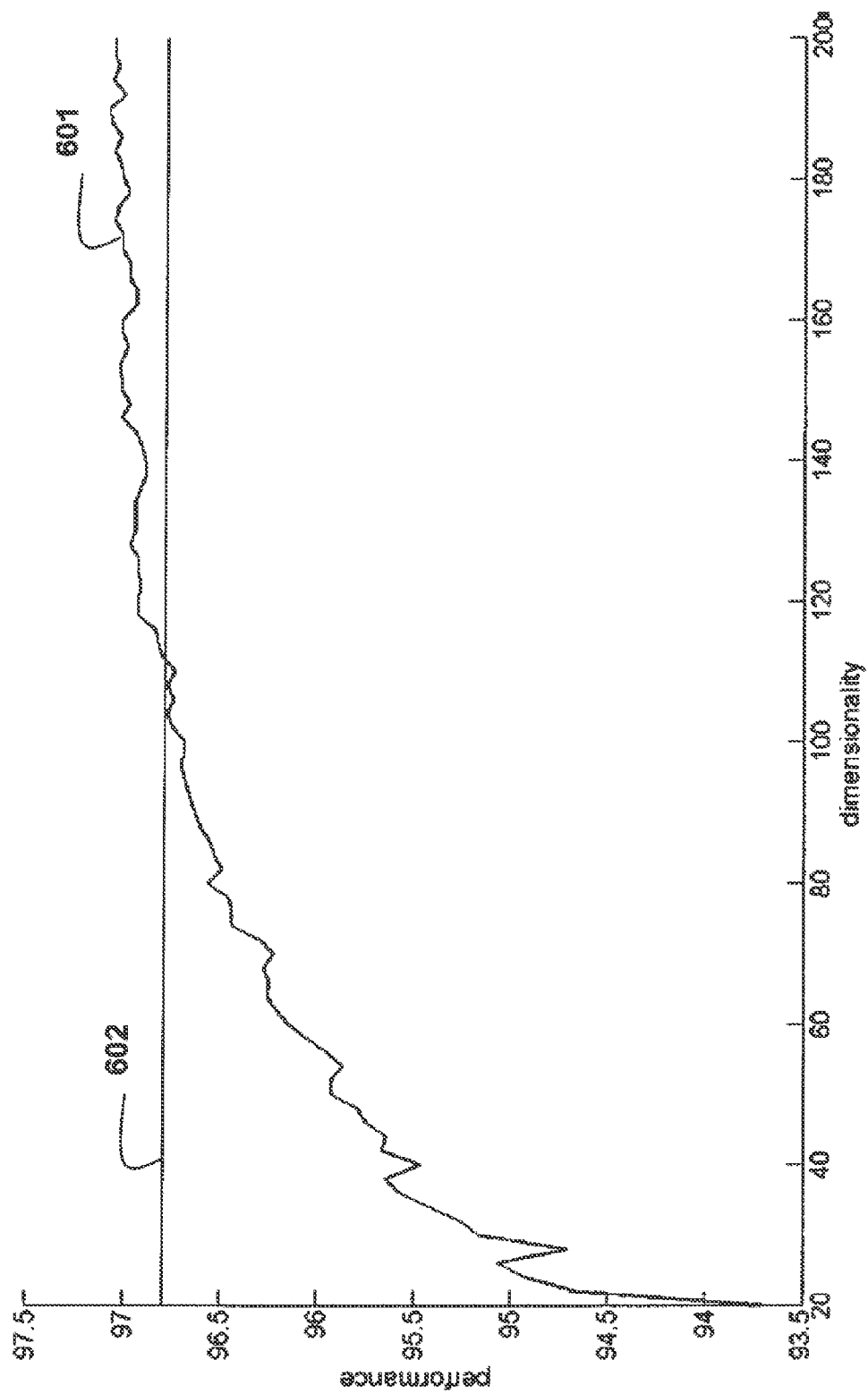
FIG. 6 is a graph comparing the performance of a conventional SVM with the SVM according to embodiments of the invention.

FIG. 6 compares the performance of our method 601 with a conventional SVM 602 as a function of dimensionality for a two-dimensional, non-separable data set.

Method

Figure 7:
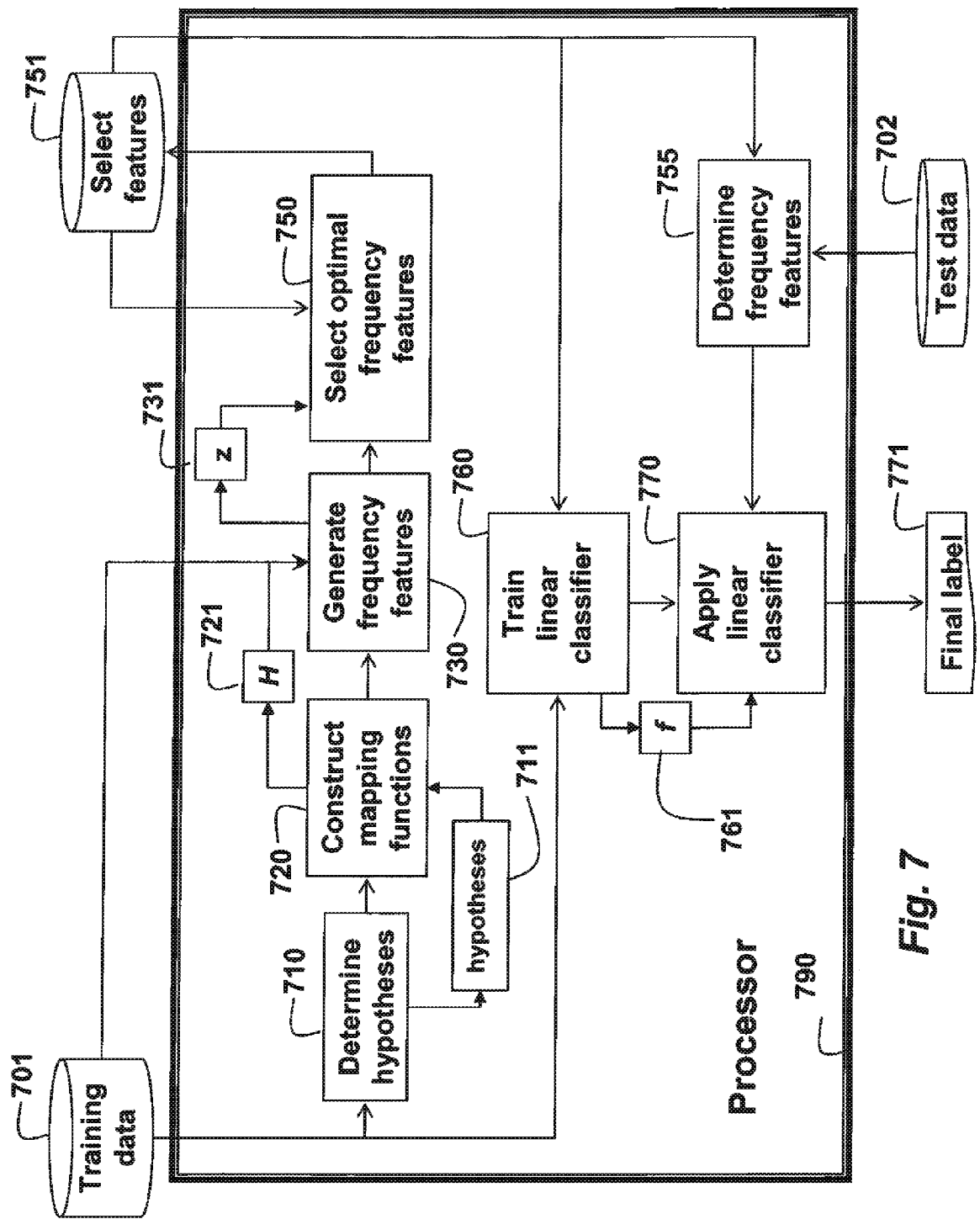
FIG. 7 is a flow diagram of a method for selecting frequency features to be used for binary classification of data.

FIG. 7 shows the basic steps of our method for selecting frequency features to be used for binary classification of data using a linear classifier. We determine 710 a set of hypotheses 711 in a d-dimensional space using d-dimensional labeled training data 701. We construct 720 a mapping function 721 for to each hypothesis.

We apply the mapping functions to the training data d-dimensional data point to generate 730 frequency features 731, and then iteratively select 750 a subset of in frequency features producing an optimal classification performance. The selected features can be stored in a memory 751.

We train 760 a linear classifier f 761 using the subset of frequency features and labels of the training data.

Subsequently during operation, the frequency features can be determined 755 for test data 702, and the linear classifier can be applied 770 to the frequency features of the test data to obtain final labels 771 that classify the test data.

The steps of the method can be performed in a processor 790 connected to memory and input/output interfaces as known in the art.

EFFECT OF THE INVENTION

To provide an optimal performance of binary classification with support vector machines, we extract frequency features of the data to represent the classification boundary. We boost the features to eliminate redundant features, and only use the relevant features.

This way, we obtain a very compact representation of the data yet still powerful enough to separate two classes. Hence, this brings speed improvement in classification as well as training phases of kernel machines. Our method results in significant speed improvement.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for selecting frequency features to be used for binary classification of data using a linear classifier, comprising the steps of:
   determining a set of hypotheses in a d-dimensional space using d-dimensional labeled training data, wherein a magnitude of each hypothesis vector is a spatial combing frequency;
   constructing a mapping function for each hypothesis;
   applying the mapping functions to the training data to generate frequency features;
   selecting iteratively a subset of the frequency features; and
   training the linear classifier using the subset of frequency features and labels of the training data, wherein the steps are performed in a processor.

2. The method of claim 1, wherein the training data include a first subset of positive training data with positive labels and a second subset of negative training data with negative labels, and basis vectors define a separating boundary between the first and second subsets of training data.

3. The method of claim 1, wherein each hypothesis is a vector ω for the training data.

4. The method of claim 1, further comprising;
   extracting separate probability distribution functions ρ+ and ρ− from the training data, wherein ρ+ is a probability distribution function of the positive labeled data, and ρ− is the probability distribution function of the subset of negative training data points;
   sampling M data points for each of distributions to construct point pairs $$\{(x^-, x^+)\}_{\{1\ldots M\}}$$

where $x^-$ is a data point from the distribution ρ− and $x^+$ is a data from the distribution ρ−; and
   assigning the hypothesis ω was the vector that connects the point pairs.

5. The method of claim 4, wherein a weighted discriminant constraint is applied while extracting the probability density functions ρ+ and ρ−.

6. The method of claim 4, wherein a mapping function is defined by $$z_\omega(x)=\sqrt{2}\cos(\omega^T x+b)$$

where T is a vector transpose operator, and b is a phase-shift parameter.

7. The method of claim 4, wherein the mapping function from $R^d \to R^z$ is defined by $$z_\omega(x)=[\cos(\omega^T(x))\sin(\omega^T(x))]^T$$

where T is a vector transpose operator.

8. The method of claim 6, wherein the phase-shift is $b=-\omega^T x^+$.

9. The method of claim 1, wherein the subset of frequency features is selected by a boosting method.

10. The method of claim 9, wherein the selection is repeated until a desired performance level for the linear classifier is achieved.

11. The method of claim 9, wherein the selection is repeated until an upper bound on a computational load is reached.

12. The method of claim 1, wherein the linear classifier is a support vector machine with linear kernel.

13. The method of claim 1, wherein the set of hypotheses selected by random sampling.

14. The method of claim 1, wherein the training data has multiple classes.

15. The method of claim 1 further comprising:
determining the frequency features for test data; and
applying the linear classifier to the frequency features to obtain final labels that classify the test data.

16. A system for selecting frequency features to be used for binary classification of data using a linear classifier, comprising a processor for:
determining a set of hypotheses in a d-dimensional space using d-dimensional labeled training data;
constructing a mapping function for each hypothesis, wherein each hypothesis is a vector, and a magnitude of each hypothesis vector is a spatial combing frequency;
applying the mapping functions to the training data to generate frequency features;
selecting iteratively a subset of the frequency features; and
training the linear classifier using the subset of frequency features and labels of the training data.

* * * * *